United States Patent
Shim et al.

(10) Patent No.: US 11,401,020 B2
(45) Date of Patent: Aug. 2, 2022

(54) UNMANNED AERIAL VEHICLE HAVING BUOYANCY APPARATUS AND ATTITUDE CONTROL METHOD THEREOF

(71) Applicant: KOREA INSTITUTE OF SCIENCE AND TECHNOLOGY, Seoul (KR)

(72) Inventors: Jae Wan Shim, Seoul (KR); Heon Phil Ha, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 298 days.

(21) Appl. No.: 16/217,746

(22) Filed: Dec. 12, 2018

(65) Prior Publication Data

US 2020/0079487 A1 Mar. 12, 2020

(30) Foreign Application Priority Data

Sep. 7, 2018 (KR) .................. 10-2018-0107260

(51) Int. Cl.
| | | |
|---|---|---|
| *B64B 1/34* | (2006.01) | |
| *B64C 39/02* | (2006.01) | |
| *B64D 47/00* | (2006.01) | |
| *B64B 1/58* | (2006.01) | |
| *B64C 27/52* | (2006.01) | |

(52) U.S. Cl.
CPC .................. *B64B 1/34* (2013.01); *B64B 1/58* (2013.01); *B64C 27/52* (2013.01); *B64C 39/024* (2013.01); *B64D 47/00* (2013.01); *B64C 2201/101* (2013.01); *B64C 2201/108* (2013.01)

(58) Field of Classification Search
CPC .... B64B 1/24; B64B 1/34; B64B 1/30; B64B 2201/00; B64C 27/43; B64C 27/52; B64C 2201/042; B64C 201/101; B64C 2201/108; B64C 2201/165
See application file for complete search history.

(56) References Cited

U.S. PATENT DOCUMENTS

| | | | |
|---|---|---|---|
| 2004/0104304 A1* | 6/2004 | Parmley | B64B 1/005 244/30 |
| 2012/0318908 A1 | 12/2012 | Morris | |
| 2014/0175214 A1 | 6/2014 | Lundgren | |
| 2019/0210723 A1* | 7/2019 | Heinen | H01Q 1/082 |

FOREIGN PATENT DOCUMENTS

| | | |
|---|---|---|
| KR | 10-2013-0081415 A | 7/2013 |
| KR | 10-2016-0057594 A | 5/2016 |
| WO | WO 2017/004826 A1 | 1/2017 |

OTHER PUBLICATIONS

Korean Office Action dated Sep. 23, 2019.
Korean Office Action dated Mar. 24, 2020.

\* cited by examiner

*Primary Examiner* — Philip J Bonzell
*Assistant Examiner* — Ashesh Dangol
(74) *Attorney, Agent, or Firm* — Rabin & Berdo, P.C.

(57) ABSTRACT

Disclosed are an unmanned aerial vehicle (UAV) having a buoyancy apparatus and an attitude control method thereof, in which the buoyancy apparatus is coupled to the UAV to reduce the energy consumption of rotors such that the time of staying in the air is extended, enabling a long flight, and in which the buoyancy apparatus absorbs the impact energy and reduces the falling speed to thereby ensure sufficient safety for the UAV.

10 Claims, 11 Drawing Sheets

UNMANNED AERIAL VEHICLE HAVING BUOYANCY APPARATUS AND ATTITUDE CONTROL METHOD THEREOF

CROSS-REFERENCE TO RELATED APPLICATION

This application claims priority to and the benefit of Korean Patent Application No. 2018-0107260, filed on Sep. 7, 2018, the disclosure of which is incorporated herein by reference in its entirety.

BACKGROUND

1. Field of the Invention

The present invention relates to an unmanned aerial vehicle (UAV) having a buoyancy apparatus and an attitude control method thereof, and more specifically, to an unmanned aerial vehicle having a buoyancy apparatus and an attitude control method thereof capable of ensuring a long flight and realizing improved stability and safety.

2. Discussion of Related Art

Generally, an unmanned aerial vehicle (UAV), for example, a drone, is a generic term for military unmanned aircrafts (i.e., military unmanned aerial vehicles) in the form of an airplane or a helicopter that may be flown and controlled by previously input information, remote control signals via wireless communication, and autonomous determination, and in around 2010, has come into various uses not only for the military but also for civil applications.

In the case of a flying object, such as a helicopter or a drone, that generates lift by rotation of a rotor, a main body of the flying object is rotated in a direction opposite to a rotation direction of the rotor by a reaction to the rotation of the rotor. Single-rotor helicopters require a tail rotor to remove the above described limitation, while drones having pairs of rotors are based on the principle of counterbalancing the reactions generated by rotation of the rotors. In addition, helicopters move forward, backward, leftward, and rightward by tilting of the rotor, while drones generally control the forward, backward, leftward and rightward movements by controlling outputs applied to four rotors. In other words, drones perform six-degrees-of-freedom movements, that is, an upward and downward movement, a leftward and rightward movement, a forward and backward movement, a pitching movement, a rolling movement, and a yawing movement by controlling rotations of the rotors.

Unlike traditional flying vehicles, such as airplanes, drones not only easily perform vertical takeoffs and landings and hovering, but also are easily remote controlled even using a smartphone as a remote-control device. In addition, unlike other flying vehicles, drones ensure precise autonomous navigation and remote control on the basis of a global positioning system (GPS) and image recognition technology.

However, drones have a number of limitations in operating video equipment having a higher resolution or filming for a long period of time due to the limited battery capacity. In addition, drone falls are also a critical safety issue to be considered. When urban areas were the place in which drones operated, as reported in cases that drone falls caused huge loss of life, safe UAVs are required.

Meanwhile, considering the size of a drone that is carried by a human, the maximum payload is limited to about 40 kg due to the nature of flight dynamics. Accordingly, there is a need to secure a desired payload using another device.

RELATED ART DOCUMENT

Patent Document (Patent document 1) Korean Laid-open Patent Publication No. 10-2016-0057594 (May 24, 2016)

SUMMARY OF THE INVENTION

The present invention is directed to providing an unmanned aerial vehicle having a buoyancy apparatus and an attitude control method thereof, capable of reducing the weight of a flight apparatus, increasing the flying time, and ensuring sufficient safety using a buoyancy apparatus.

The technical objectives of the present invention are not limited to the above, and other objectives may become apparent to those of ordinary skill in the art based on the following descriptions.

According to an aspect of the present invention, there is provided an unmanned aerial vehicle (UAV) having a buoyance apparatus, including a flight apparatus equipped with multiple rotors, a buoyancy apparatus including buoyancy parts disposed to be spaced apart from each other and configured to secure buoyancy through injection of light gas, and a connection frame which is connected between the buoyancy parts disposed to be spaced apart from each other and to which the flight apparatus is fixed such that the flight apparatus has a rotational degree of freedom about a single axis direction.

The connection frame may include a first fixed connection member to which the flight apparatus is fixed, second fixed connection members each connected to a corresponding one of the buoyancy parts, and a rotational coupling part connected between the first fixed connection member and the second fixed connection member.

The connection frame may further include an auxiliary connection member configured to hold a weight object thereon, and the auxiliary connection member may include at least two auxiliary connection members and may be connected to the second fixed connection member through a revolving joint. Accordingly, the connection frame may be substantially lattice shaped, in which the connection frame may have a triangular shape when the connection frame includes two auxiliary connection members and the two auxiliary connection members are coupled through a revolving joint and may have a rectangular shape when the connection frame further includes an auxiliary connection member parallel to the first and second fixed connection members and the auxiliary connection members are connected through revolving joints.

The first fixed connection member may include a pair of first fixed connection members spaced apart from each other and coupled to the flight apparatus while having the flight apparatus interposed therebetween. In this case, the first fixed connection members may be provided with a length that is adjustable such that even a flight apparatus having a different size is easily coupled to the connection frame.

The second fixed connection member may be connected to a surface of the buoyancy apparatus, and an extension line of the second fixed connection member may pass through a center of buoyancy existing inside the buoyancy apparatus or cross a vertical axis passing through the center of buoyancy of the buoyancy apparatus when the buoyancy apparatus is arranged in a horizontal direction.

According to another aspect of the present invention, there is provided a UAV having a buoyancy apparatus, including a flight apparatus equipped with multiple rotors, a buoyancy apparatus including buoyancy parts disposed to be spaced apart from each other and configured to secure buoyancy through injection of light gas, and a connection frame configured to fix the flight apparatus between the buoyancy parts disposed to be spaced apart from each other, in which the connection frame includes guide rails installed on opposite lateral surfaces of the buoyancy parts in a longitudinal direction and fixed to the buoyancy parts and a fixed connection member allowing the flight apparatus to perform rotation and perform a position shift along the guide rails.

The fixed connection member may be provided at opposite ends thereof with movement rotation coupling parts that allow the fixed connection member to rotate and allow the fixed connection member to move along the guide rails such that the flight apparatus is rotated and moved together with the fixed connection member through the movement rotation coupling parts.

The guide rails may additionally include a fixed connection member that is installed to be movable along the guide rails, and a weight object may be installed on the additional fixed connection member.

According to another aspect of the present invention, there is provided a method of controlling an attitude of an unmanned aerial vehicle (UAV) including a flight apparatus equipped with multiple rotors, a buoyancy apparatus including buoyancy parts disposed with the flight apparatus interposed therebetween and configured to secure buoyancy through injection of gas, and a connection frame coupling the flight apparatus to be moveable and rotatable with respect to a reference line of the buoyancy apparatus, the method including sensing an attitude of the flight apparatus, sensing energy supplied to motors connected to rotors of the flight apparatus, and correcting to move the flight apparatus such that a straight line connecting a center of gravity and a center of buoyancy of the UAV is parallel with a direction of gravity.

The UAV may further include a weight object that is coupled to the connection frame to be movable with respect to the reference line of the buoyancy apparatus, and the correcting may further include a correction to move the weight object such that a straight line connecting a center of gravity and a center of buoyancy of the UAV is parallel with a direction of gravity.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
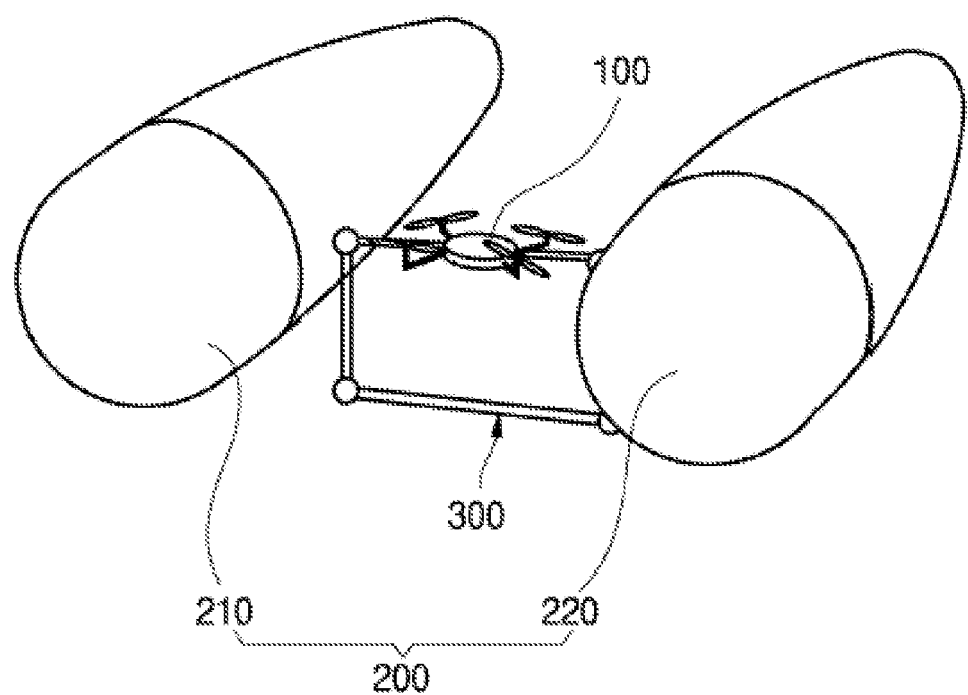
FIGS. 1 to 3 are perspective views illustrating an unmanned aerial vehicle (UAV) having a buoyancy apparatus according to the present invention.

While the present invention is susceptible to various modifications and alternative embodiments, specific embodiments thereof are exemplarily shown in the drawings and will be described. However, it should be understood that there is no intention to limit the present invention to the particular embodiments disclosed, and, on the contrary, the present invention is to cover all modifications, equivalents, and alternatives falling within the spirit and scope of the present invention. The same reference numerals are used to refer to the same elements through the description of the figures.

Terms used herein are only for the purpose of distinguishing one component from another component. The terms are used to describe particular embodiments only and are not intended to be limiting of the present invention. As used herein, the singular forms "a," "an," and "the" are intended to include the plural forms as well, unless the context clearly indicates otherwise.

Hereinafter, embodiments of the present invention will be described in detail with reference to the accompanying drawings.

Figure 2:
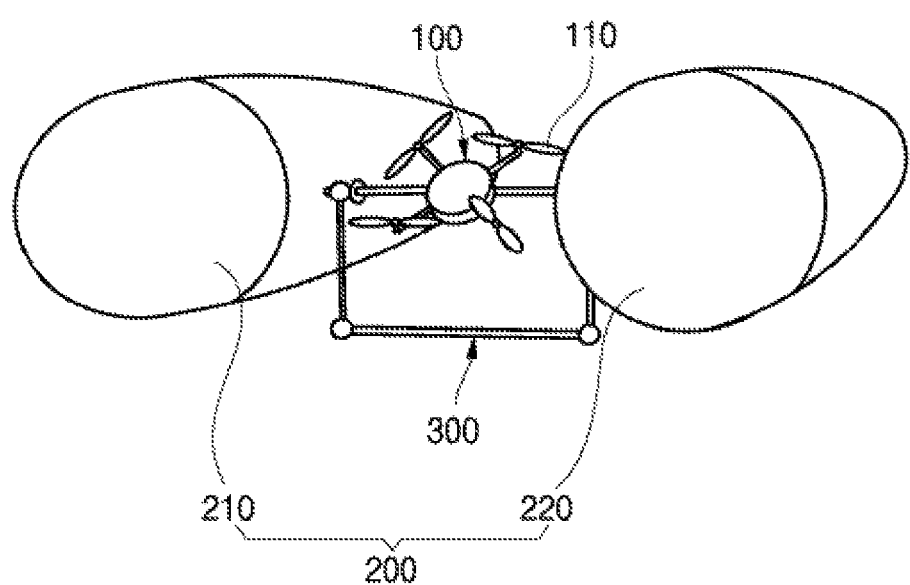
Figure 3:
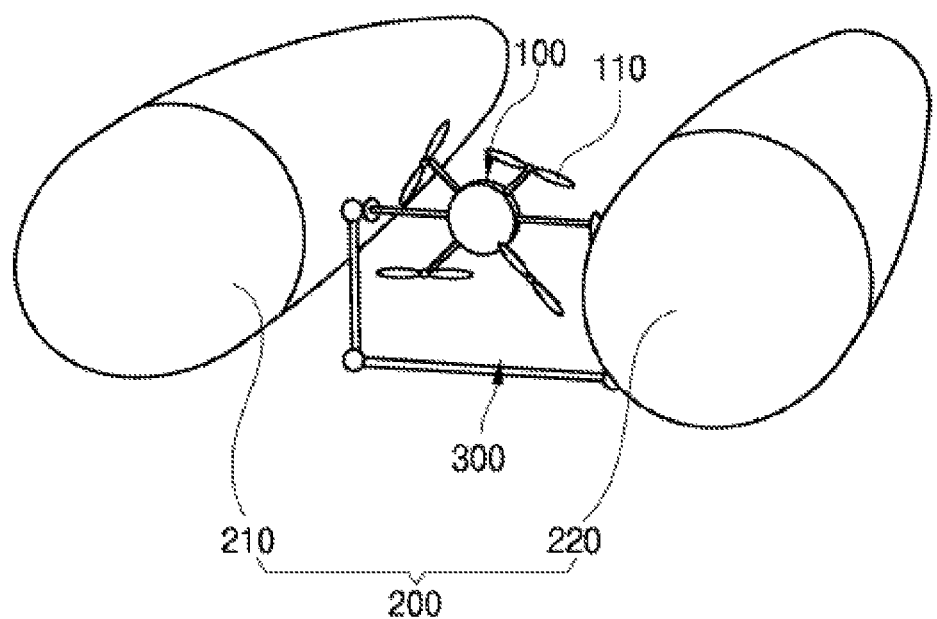

FIGS. 1 to 3 are perspective views illustrating an unmanned aerial vehicle (UAV) having a buoyancy apparatus according to the present invention.

Referring to FIGS. 1 to 3, the UAV having the buoyancy apparatus according to the present invention includes a flight apparatus 100, a buoyancy apparatus 200, and a connection frame 300.

The flight apparatus 100 is provided in the form of a multi-rotor type flight apparatus including a plurality of extending frames extending outward from a main body and rotors 110 formed at the respective end portions of the extending frames to be rotationally driven.

The buoyancy apparatus 200 is a structure that is expanded by injection of gas lighter than air, such as helium, to secure buoyancy. According to an embodiment of the present invention, the buoyancy apparatus 200 includes a first buoyancy part 210 and a second buoyancy part 220 that are disposed on the opposite sides of the flight apparatus 100 with the fight apparatus 100 interposed therebteween.

The buoyancy apparatus 200 includes a material that may endure a pressure to obtain desired buoyancy. For example, the buoyancy apparatus 200 may be implemented using a material that has resistance to leaking of injected gas and is high strength and lightweight. That is, the buoyancy apparatus 200 may be implemented using carbon fiber, polyester synthetic fiber, or composite fabric thereof generally known in the art. However, the buoyancy apparatus 200 is not limited thereto and may be provided with other materials and material properties in addition to the above.

The buoyancy apparatus 200 may have a substantially streamlined shape such that the buoyance apparatus 200 receives less air resistance during flight in the air in a state in which the buoyance apparatus 200 is injected with gas to obtain desired buoyancy. According to the embodiment of the present invention, the first buoyancy part 210 and the second buoyancy part 220 of the buoyancy apparatus 200 have a streamlined columnar shape. Since the streamlined buoyancy apparatus 200 is connected to the flight apparatus 100, the general flight apparatus 100 flying only on the power provided by a battery is provided with auxiliary power so that the flying time and flying distance of the UAV are increased.

Although the buoyancy apparatus 200 according to the embodiment of the present invention has a streamlined columnar shape, the buoyancy apparatus 200 may be provided in a torus shape, i.e., a donut shape or other various shapes in many cases, for example, when hovering is a major flight mission or air resistance is not significantly considered.

The connection frame 300 is a coupling device that allows the flight apparatus 100 to be coupled to the buoyancy apparatus 200. The connection frame 300 has a frame shape and is installed as a unitary assembly while having the flight apparatus 100 interposed between the first buoyancy part 210 and the second buoyancy part 220

The coupling of the connection frame 300, the flight apparatus 100, and the buoyancy apparatus 200 may be achieved as an integral coupling or detachable coupling manner.

Figure 5:
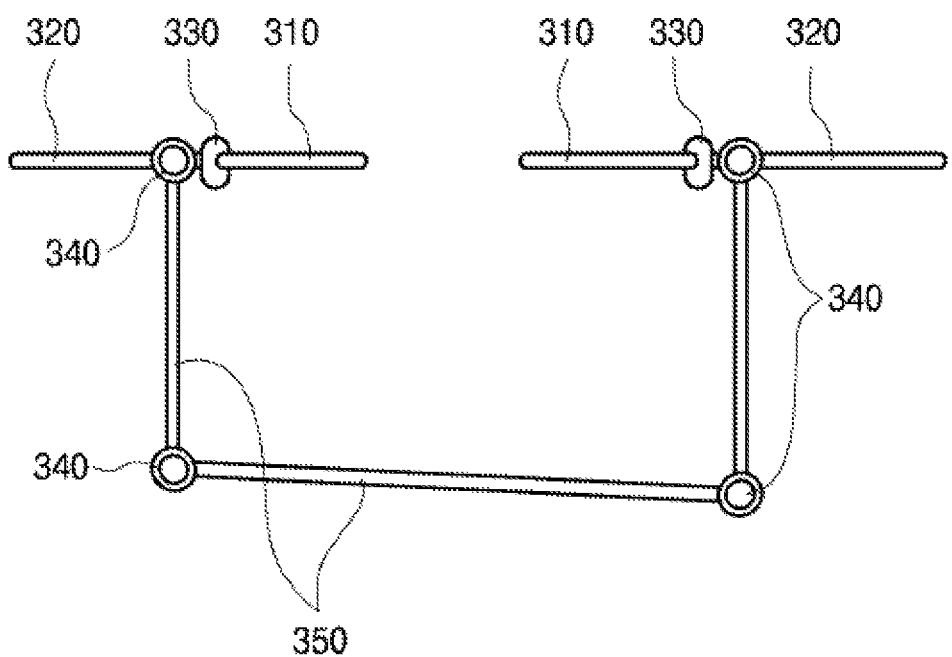
FIG. 5 is a view illustrating a connection frame of a UAV having a buoyancy apparatus according to an embodiment of the present invention.

Referring to FIG. 5 illustrating a connection frame according to an embodiment of the present invention, the connection frame 300 includes first fixed connection members 310 fixed to the flight apparatus 100, second fixed connection members 320 fixed to the buoyancy apparatus 200, and rotational coupling parts 330 connecting the first fixed connection members 310 to the second fixed connection members 320.

According to the embodiment shown in the drawing, the pair of first fixed connection members 310 are installed opposite to each other such that the first fixed connection members are coupled to the flight apparatus 100 with the flight apparatus 100 interposed therebetween, and the pair of second fixed connection members 320 extend in opposite directions while each having a corresponding one of the rotational coupling parts 330 interposed between the first fixed connection member 310 and the second fixed connection member 320 and each coupled to a corresponding one of the first buoyancy part 210 and the second buoyancy part 220. An extension line of the second fixed connection member 320 may pass through the center of buoyancy existing inside the buoyancy apparatus 200 or may cross a vertical axis passing through the center of buoyancy of the buoyancy apparatus 200 when the buoyancy apparatus 200 is arranged in the horizontal direction.

The first fixed connection member 310 coupled to the flight apparatus 100 is connected to be rotatable with respect to the second fixed connection member 320 coupled to the buoyance apparatus 200 by the rotational coupling part 330.

According to the embodiment of the present invention, the connection frame 300 may further include an auxiliary connection member 350 to form a lattice shape. Revolving joints 340 are installed on the second fixed connection members 320, and vertical direction auxiliary connection members 350 extending downward are coupled to the revolving joints 340. The revolving joints 340 are provided at lower ends of the vertical direction auxiliary connection members 350, and a horizontal direction auxiliary connection member 350 is provided between the revolving joints 340 such that the connection frame 300 forms a substantially rectangular shape. The auxiliary connection members 350 increase the structural stability of the connection frame 300 and allow a weight object, such as a photographing apparatus, cargo, and the like, to be mounted thereon, which will be described below.

According to the present invention, the coupling of the connection frame 300 and the buoyancy apparatus 200 is fixed for both the position shift and the rotational movement, while the coupling of the connection frame 300 and the flight apparatus 100 is fixed for position shift but has one degree of freedom for rotational movement. That is, the coupling of the connection frame 300 and the flight apparatus 100 enables a pitching movement.

Figure 4:
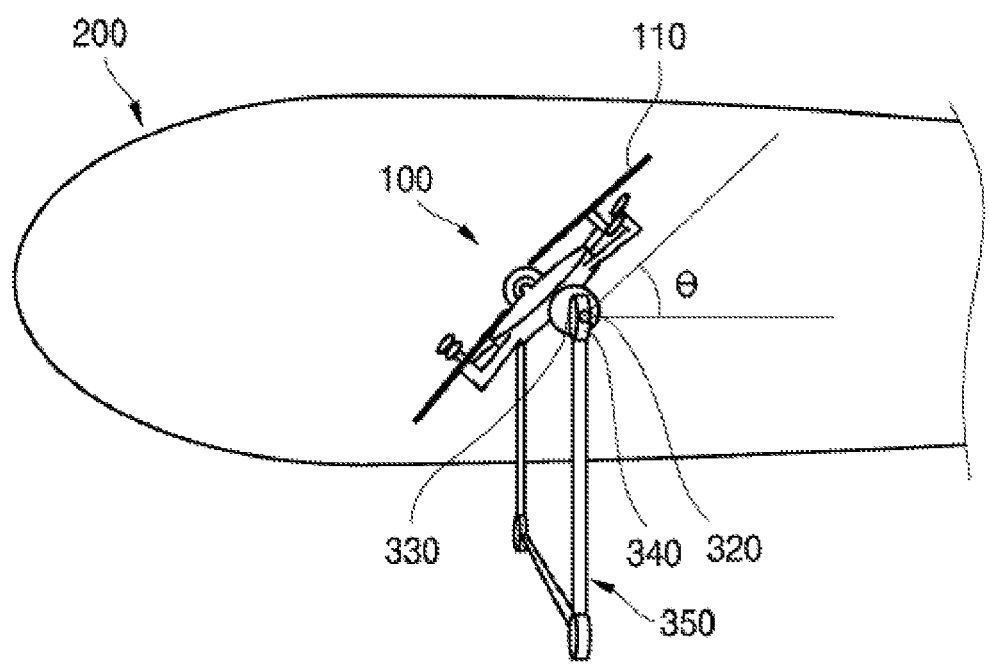
FIG. 4 is a view illustrating an angle between a longitudinal direction of a buoyancy apparatus and a thrust direction of a flight apparatus according to the present invention.

Referring to FIGS. 2 and 4, the angle of inclination of the flight apparatus 100 is adjusted for the flight apparatus 100 to be inclined downward toward the front thereof, and an angle θ between a longitudinal direction of the buoyancy apparatus 200 and a thrust direction of the flight apparatus 100 is approximately 45 degrees. When the buoyancy apparatus 200 is disposed in a space in which air flows uniformly in the horizontal direction, an attitude, that is, an arrangement, in which air resistance is minimized is provided. In the corresponding arrangement, when a horizontal straight line passing through or touching the buoyancy apparatus 200 while in parallel with a direction of air flow is obtained, the horizontal straight line becomes a reference line of the buoyancy apparatus 200. In the embodiment shown in FIG. 2, the reference line of the buoyancy apparatus 200 extends in the longitudinal direction of the buoyancy apparatus 200. This represents that the thrust direction of the flight apparatus 100 is adjusted to form an angle of 45 degrees with respect to the reference line of the buoyancy apparatus 200. Accordingly, the UAV may stably fly forward. Meanwhile, FIG. 3 is a view illustrating the thrust direction of the flight apparatus 100 that is adjusted to form an angle of 90 degrees with respect to the reference line of the buoyance apparatus 200, which shows that the thrust direction of the flight apparatus 100 is freely adjusted with respect to the reference line of the buoyancy apparatus 200 according to the present invention.

According to the present invention, the rotational coupling part 330, which allows the flight apparatus 100 to have a rotational degree of freedom on a single axis direction with respect to the connection frame 300 and the buoyancy apparatus 200 fixedly coupled to the connection frame 300, may be provided using a component that supports rotation without using an additional driving source, such as a revolving joint, or may be provided using a driving component that generates a rotational driving, such as a rotary motor.

When the flight apparatus 100 performs a movement with six degrees of freedom using the connection frame 300, the buoyancy apparatus 200 integrally coupled to the flight apparatus 100 is caused to perform a movement with six degrees of freedom together with the flight apparatus 100.

According to the embodiment of the present invention, the flight apparatus 100 is provided with an attitude sensor that senses the angle of inclination with respect to the connection frame 300. The attitude sensor is a sensor for detecting a change with respect to three axes and may be provided as a gyro sensor.

Figure 6:
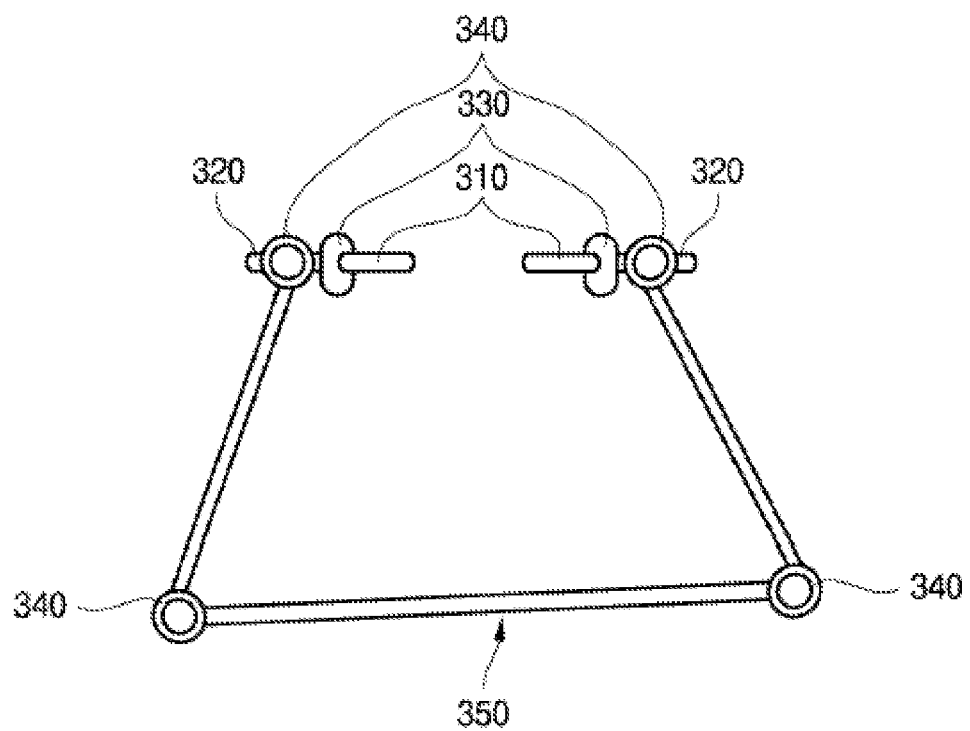
FIG. 6 is a view illustrating a connection frame of a UAV having a buoyancy apparatus according to another embodiment of the present invention.

FIG. 6 is a view illustrating a connection frame 300 of a UAV having a buoyancy apparatus 200 according to another embodiment of the present invention.

Referring to FIG. 6, when a flight apparatus 100 having a size smaller than that of the flight apparatus shown in FIGS. 1 to 3 is installed in between the buoyancy parts 210 and 220, the connection frame 300 may be adjusted to match with the smaller flight apparatus 100. In detail, lengths of the first fixed connection members 310 may be adjusted to reduce an interval between the first fixed connection members 310, or lengths of the second fixed connection members 320 may be adjusted. Since a rotational degree of freedom of the connection frame 300 is secured by the revolving joint 340, the adjustment of the lengths of the first and second fixed connection members 310 and 320 is not restricted by the auxiliary connection member 350. Referring to FIG. 6, as the flight apparatus 100 is coupled to the first fixed connection members 310 in a state in which an upper side of the connection frame 300, that is, the interval between the first fixed connection members 310 to which the flight apparatus 100 is connected is reduced, the connection frame 300 has an isosceles trapezoidal shape as a whole.

Figure 7:
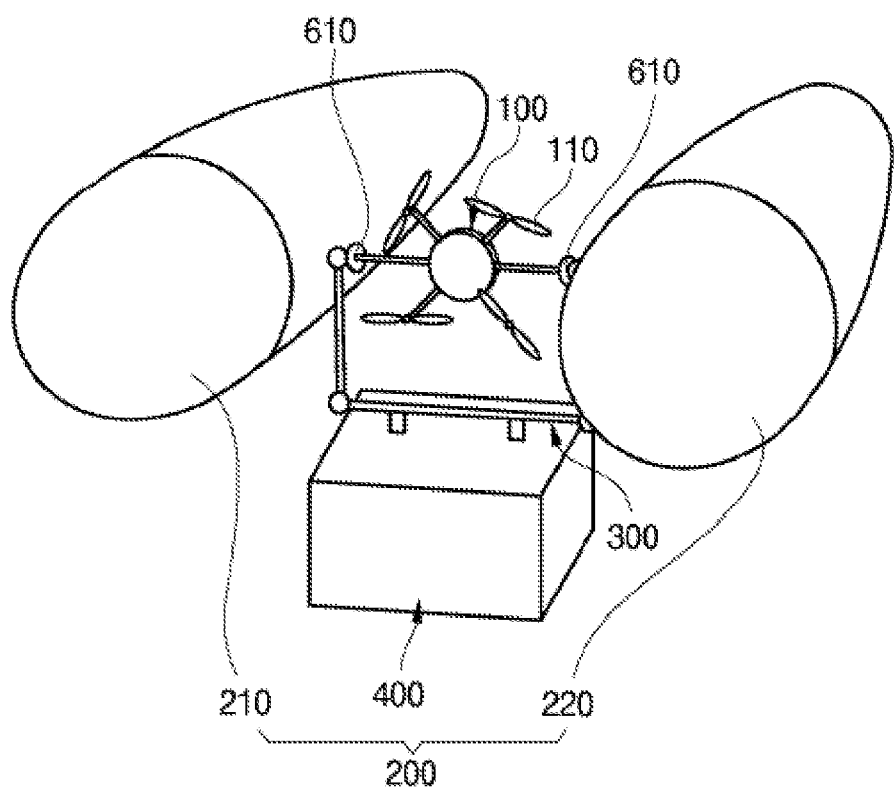
FIGS. 7 to 9 are perspective views illustrating a UAV having a buoyancy apparatus equipped with a weight object according to the present invention.

FIG. 7 is a perspective view illustrating a UAV having a buoyancy apparatus equipped with a weight object according to the present invention, which shows that the UAV makes a flight with a weight object 400, such as cargo or a photographing apparatus, held on the auxiliary connection member 350 provided below the connection frame 300. As such, the auxiliary connection member 350 allows the connection frame 300 to hold the weight object 400 thereon. In order to hold the weight object 400, a fixing device for fixing the weight object 400 to the auxiliary connection member 350 may be coupled to the auxiliary connection member 350.

When the weight object 400 is held on the UAV according to the present invention, the center of gravity of the UAV may be changed. The UAV is kept balanced by adjusting the rotating direction and rotating speed of the rotor 110 installed in the flight apparatus 100 to adjust the angle between the reference line of the buoyance apparatus 200 and the thrust direction of the flight apparatus 100.

Figure 8:
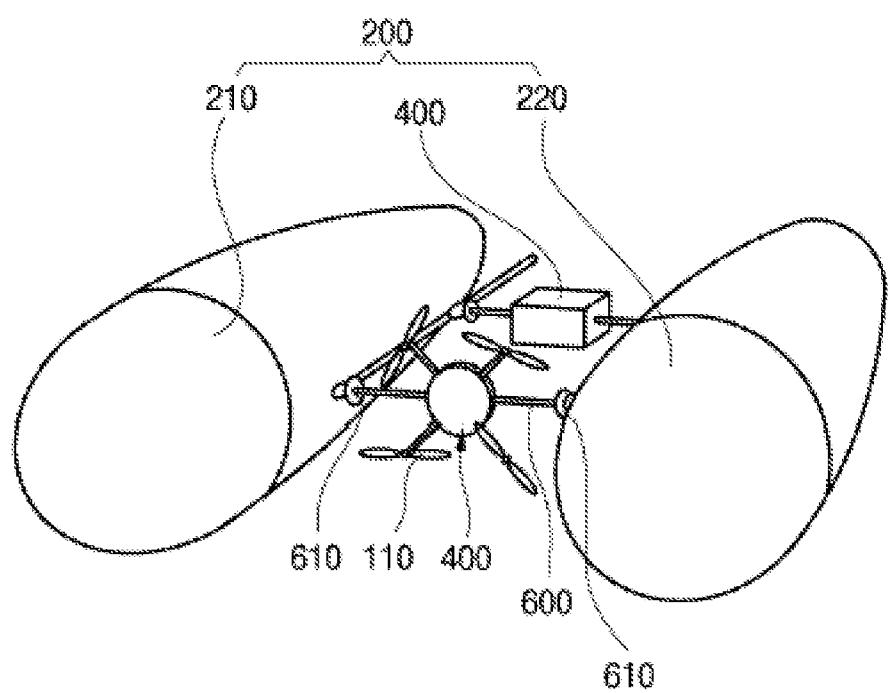
Figure 9:
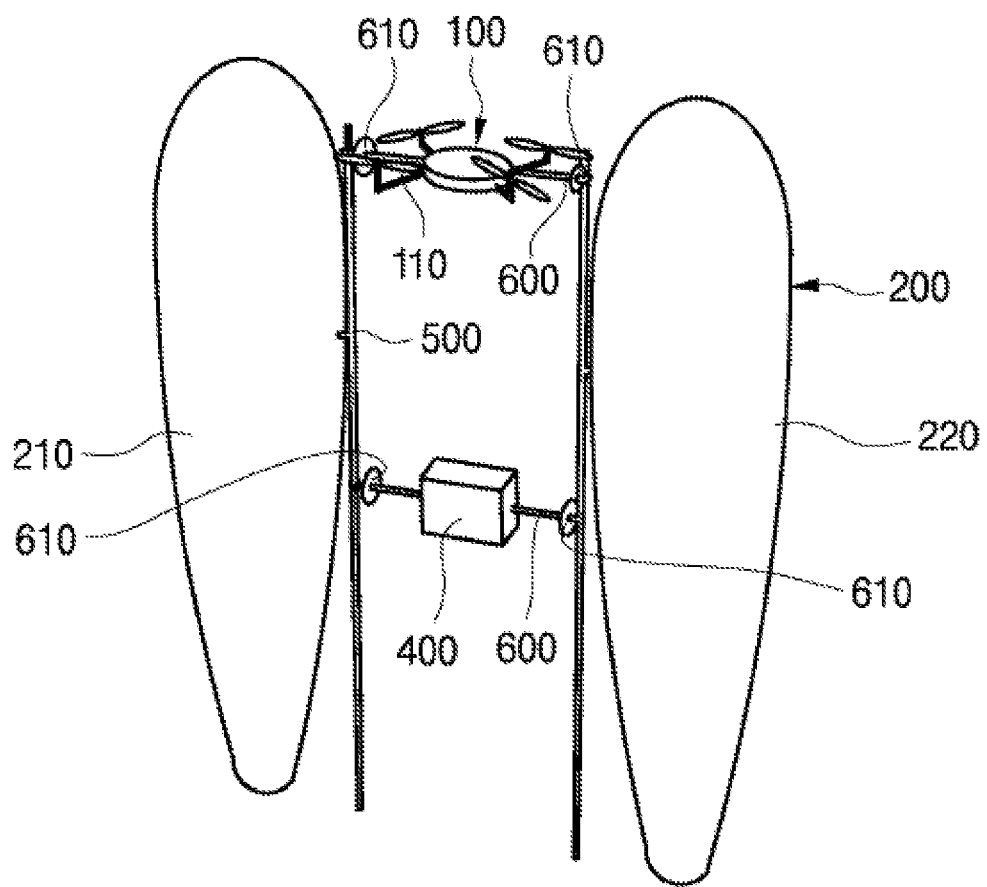

FIGS. 8 and 9 are views for describing a UAV having a buoyancy apparatus according to another embodiment of the present invention. In the following description of the UAV having the buoyancy apparatus according to the embodiment of the present invention, the same reference terms and numerals will be assigned to parts identical to those of the previous embodiment and parts having functions identical to those of the previous embodiment, and details of the parts will be omitted in order to avoid redundancy.

Referring to FIG. 8, the UAV having the buoyancy apparatus according to the embodiment of the present invention includes a flight apparatus 100, a buoyancy apparatus 200, and a connection frame that couples the flight apparatus 100 to the buoyancy apparatus 200, and the configuration of the connection frame is different from that of the connection frame of the previous embodiment.

The connection frame according to the embodiment of the present invention includes guide rails 500, fixed connection members 600, and movement rotation coupling parts 610.

The guide rails 500 extend lengthwise along lateral sides of a first buoyancy part 210 and a second buoyancy part 220 of the buoyancy apparatus 200 in a direction of a reference line of the buoyancy apparatus 200 and are fixed to the buoyancy apparatus 200.

The fixed connection member 600 couples the flight apparatus 100 to the buoyancy apparatus 200. The fixed connection member 600 serves the same function as that of the first fixed connection member 310 of the connection frame 300 according to the previous embodiment and is coupled to the flight apparatus 100. Similar to the first fixed connection member 310, the fixed connection member 600 may be provided in the pair of fixed connection members 600 while being spaced apart from each other such that the flight apparatus 100 is coupled to the fixed connection members 600 while being disposed between the fixed connection members 600. In addition, each of the pairs of first fixed connection members 310 and fixed connection members 600 may be provided as a connected unitary member and may be coupled to the flight apparatus 100.

The fixed connection member 600 is provided at end portions thereof with the movement rotation coupling parts 610 and is coupled to the guide rails 500 through the movement rotation coupling parts 610. The movement rotation coupling parts 610 allow movement of the fixed connection member 600 along the guide rails 500 to be adjusted and allow the fixed connection member 600 to rotate with respect to the guide rails 500 and the buoyancy apparatus 200 to which the guide rails 500 are fixed, as in the rotational coupling part 330.

Accordingly, the flight apparatus 100 is moved together with the fixed connection member 600 along the guide rails 500 such that the center of gravity of the UAV is adjusted to keep the balance and is adjusted to correspond with the thrust direction with respect to the buoyancy apparatus.

According to another embodiment of the present invention, the guide rails 500 may further include a fixed connection member 600 to hold a weight object 400 thereon. As the fixed connection member 600 on which the weight object 400 is held is moved along the guide rails 500 behind the fixed connection member 600 to which the flight apparatus 100 is coupled by the movement rotation coupling part 610, a position shift is performed such that the center of gravity of the UAV is adjusted.

The center of gravity of the UAV is determined by the positions of the flight apparatus 100, the buoyancy apparatus 200, the connection frame, and the weight object 400, and according to the present invention, the positions of the flight apparatus 100 and the weight object 400 may be adjusted such that the center of buoyancy matches the center of gravity to thereby secure the operation stability and efficiency.

When the weight object 400, such as cargo, is carried in the vertical direction in a narrow place using the UAV according the embodiment of the present invention, the UAV may be used to raise the cargo to a certain position from the ground or from around the ground and lower the cargo from the certain position to the ground or to around the ground by moving in the vertical direction. In order to keep the balance of the weight, the UAV may adjust the positions of the flight apparatus 100 and the weight object 400 along the guide rails 500.

Meanwhile, when the flight apparatus 100 according to the embodiment of the present invention is provided with a sliding adjustment part that adjusts a sliding movement along the fixed connection member 600, an action of adjusting the center of gravity through a movement in the lateral direction between the first and second buoyancy parts 210 and 220 may also be performed.

Figure 10:
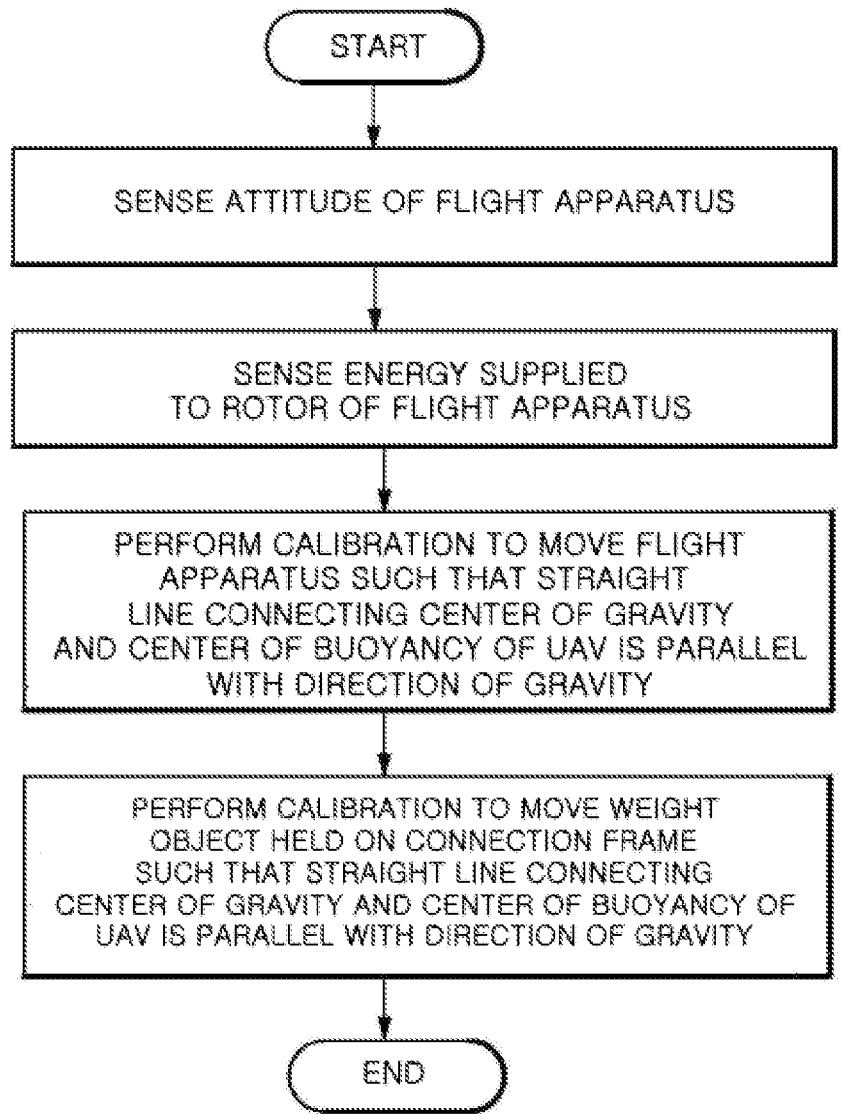
FIG. 10 is a flowchart showing a method of controlling an attitude of a UAV according to the present invention.
Figure 11:
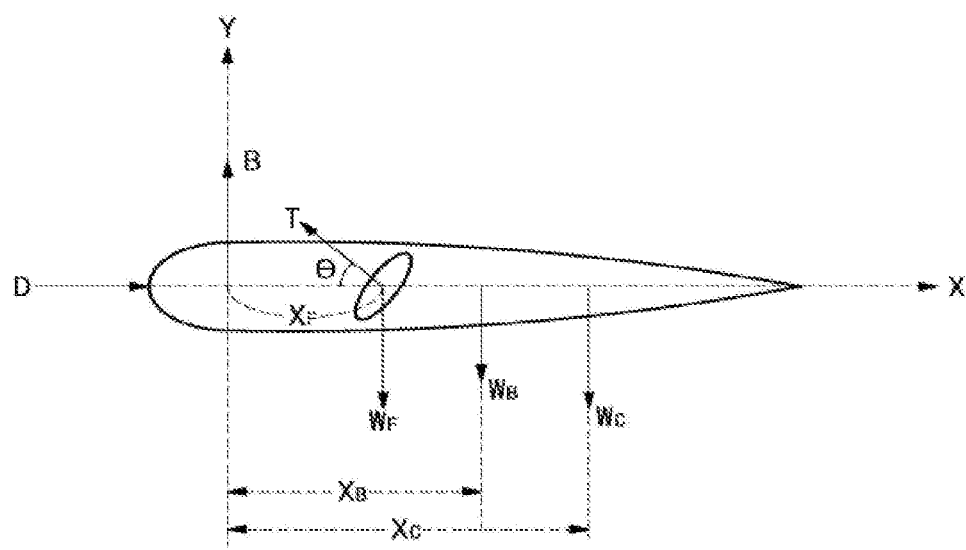
FIG. 11 is a view illustrating buoyancy, drag, and thrust of a UAV according to the present invention.

FIG. 10 is a flowchart showing a method of controlling an attitude of a UAV according to the present invention, and FIG. 11 is a view illustrating a principle of controlling an attitude of a UAV according to the present invention.

The UAV according to the present invention includes an attitude sensor configured to sense the degree to which the flight apparatus 100 is inclined, an energy sensing device that senses the energy (power) supplied to drive each rotor 110 of the flight apparatus 100, and a controller configured to control the operation of the UAV.

The attitude sensor senses an inclined angle at which the flight apparatus 100 is inclined with respect to the connection frame to which the flight apparatus 100 is connected, to thereby sense the degree to which the flight apparatus 100 is inclined from the horizontal state. The attitude sensor may be implemented as a gyro sensor provided in the flight apparatus 100. The attitude sensor may be implemented using various sensors used in flight apparatuses such as a drone.

The energy sensing device senses the energy supplied to drive each rotor 110 such that a difference between energies supplied to the respective rotor 110 and the total supplied energy are determined.

The controller controls the attitude of the UAV such that the UAV has a desired attitude with less energy consumption using sensing values of the attitude sensor and the energy sensing device.

First, the principle of controlling an attitude in the method of controlling an attitude of a UAV according to the present invention will be described with reference to FIG. 11. FIG. 11 illustrates buoyancy, drag, and thrust of the UAV according to the present invention. B denotes buoyancy, D denotes drag, and T denotes thrust, and $W_F$ denotes the weight of the flight apparatus, $W_B$ denotes the weight of the buoyancy part, and $W_C$ denotes the remaining weight including the weights of the connection frame and the weight object, and for the sake of convenience of expression, WC is marked as the weight of the weight object.

$$B + T \sin \theta = W_F + W_B + W_C \qquad \text{①}$$

$$D = T \cos \theta \qquad \text{②}$$

$$T \sin \theta X_F - W_F X_F - W_B X_B - W_C X_C = 0 \qquad \text{③}$$

Equation ① relates to the equilibrium of force in the Y axis direction, Equation ② relates to the equilibrium of force in the X axis direction, and Equation ③ relates to the equilibrium of rotational force about a Z axis. Here, $X_F$, $X_B$, and $X_C$ consecutively refer to the positions of the center of gravity of the flight apparatus, the center of gravity of the buoyancy part, and the center of gravity of the weight object on the X axis when the center of buoyancy is defined as the origin.

From Equations ① and ②, it can be seen that $$\tan \theta = \frac{W_F + W_B + W_C - B}{D},$$

and from Equations ① and ③, Equation ④ is obtained as follows.

$$(W_B + W_C - B)X_F = W_B X_B + W_C X_C \qquad \text{④}$$

When the center of gravity of the entire UAV is $X_P$, the following equation is generated as $$(W_F + W_B + W_C)X_P = W_F X_F + W_B X_B + W_C X_C, \text{ and}$$

subsequently the following equation is obtained as $$X_P = \frac{W_F X_F + W_B X_B + W_C X_C}{W_F + W_B + W_C}.$$

When $X_P = 0$, the following equation is obtained as follows.

$$W_B X_B + W_C X_C = -W_F X_F$$

The following equation is obtained from ④.

$$(W_B + W_C - B)X_F = -W_F X_F$$

When $X_F$ is zero, a force of rotation about the Z axis is not easily generated by the flight apparatus, and thus the overall balance needs to be maintained by adjusting the positions of the buoyancy part and the weight object. When $X_F$ is not zero, the following equation is obtained.

$$(W_B + W_C - B) = -W_F$$

Accordingly, the following result is obtained from ①.

$$T \sin \theta = 0$$

That is, the center of gravity and the center of buoyancy of the UAV are allowed to match each other on the X-axis, and all the thrust of the flight apparatus 100 is used to move the flight apparatus 100 forward so that the energy is saved. When the buoyancy is insufficient to support the total weight, the center of total buoyancy including the buoyancy caused by the thrust and the buoyancy is allowed to match the center of gravity on the X-axis so that the air resistance at a time of flight may be reduced.

As described above, the method of controlling the attitude of the UAV of the present invention operates on the basis of the principle of controlling an attitude by matching the center of buoyancy and the center of gravity on the X-axis, that is, by allowing a straight line connecting the center of gravity and the center of buoyancy of the UAV to be parallel with the direction of gravity.

Referring to FIG. 10, the method of controlling an attitude of a UAV senses an attitude on the basis of a hovering state.

In the method of controlling an attitude of a UAV, an attitude sensing operation is performed to sense the degree to which the flight apparatus is inclined. In the attitude sensing operation, assuming that the flight apparatus flies above a flat ground, whether a horizontal plane of the flight apparatus is parallel with the ground or is inclined with respect to the ground is sensed.

Then, an energy sensing operation is performed to sense the energy supplied to each rotor 110 of the flight apparatus 100 to drive the rotor 110.

Then, a correcting operation is performed. The correcting operation includes an operation of correcting the position of the flight apparatus and/or the position of the weight object such that the flight apparatus takes a flight attitude according to a command of the controller while reducing the energy consumption. The controller of the flight apparatus controls the flight apparatus to take a flight attitude suitable for the operation state of the flight apparatus. The controller controls the energy supplied to each rotor such that the flight apparatus takes a flight attitude according to the command of the controller, and in this case, the energy consumption for driving the rotor may vary depending on the position of the flight apparatus and/or the position of the weight object with respect to the buoyant apparatus. The correcting operation calibrates the position of the flight apparatus and/or the position of the weight object such that the sum of energies required to drive the rotors is reduced when the flight apparatus takes the flight attitude according to the command, that is, the energy consumption of the flight apparatus is reduced.

For example, in order for the UAV to be horizontal in a hovering state, the correcting operation may be performed when the difference between energies supplied to the rotors 110 of the flight apparatus 100 exceeds a preset value.

In addition, the correcting operation may be performed when the UAV is able to be horizontal even at the maximum supply of energy allowable to at least one rotor.

The correcting operation includes a correcting action of calibrating such that a straight line connecting the center of the gravity of the UAV and the center of buoyancy of the buoyancy apparatus is made parallel with the direction of gravity.

The correcting action includes a movement action of the flight apparatus in which the flight apparatus is moved along the guide rails and a movement action in which the weight object is moved along the guide rails.

In addition, the correcting action includes a movement action in which the flight apparatus and the weight object are moved along the guide rails such that the center of total buoyancy including the buoyancy caused by the thrust and the buoyancy generated by the buoyancy apparatus is allowed to match the center of gravity of the UAV when it is determined that the buoyancy generated by the buoyance apparatus is insufficient.

The movement action of the flight apparatus and the movement action of the weight object are performed such that first, the flight apparatus and the weight object are moved to approach each other at a preset interval, the influence of the movements of the flight apparatus and the weight object on the shift of the center of gravity is calculated, and then the flight apparatus and the weight object are moved according to a predetermined program.

When the straight line connecting the center of gravity and the center of buoyancy of the UAV is made parallel with the direction of gravity, the controller determines that the calibration is complete and maintains the corresponding attitude.

Accordingly, the energy consumption is reduced using a method of reducing the number of rotations of the rotor 110 by coupling the buoyancy apparatus 200 to the flight apparatus 100 or the like such that the time of staying in the air is increased, thereby enabling a long flight.

In addition, since the buoyancy apparatus 200 absorbs impact energy at a time of falling or landing and reduces the fall speed, the UAV is provided with sufficient stability.

In addition, in order to reduce the air resistance to keep the speed of the UAV constant, the position of the flight apparatus or the position of the weight object is calibrated such that the buoyancy apparatus 200 always maintains a streamlined attitude.

As is apparent from the above, the unmanned aerial vehicle having the buoyancy apparatus and the attitude control method thereof can extend the time of staying in the air by coupling the buoyancy apparatus to the UAV to reduce the number of rotations of the rotor or reduce the size of the rotor, thereby enabling a long flight.

In addition, the unmanned aerial vehicle having the buoyancy apparatus and the attitude control method thereof can absorb impact energy and reduce the falling speed using the buoyancy apparatus, thereby ensuring sufficient stability for the UAV.

Although the exemplary embodiments of the present invention have been described for illustrative purposes, those skilled in the art should appreciate that various modifications, additions, and substitutions are possible without departing from the scope and spirit of the present invention.

What is claimed is:

1. An unmanned aerial vehicle (UAV), comprising:
    a flight apparatus including a plurality of extending frames extending outward from a main body and rotors formed at respective end portions of the extending frames to be rotationally driven;
    a buoyancy apparatus including buoyancy parts disposed to be spaced apart from each other and configured to secure buoyancy through injection of gas; and
    a connection frame which is connected between the buoyancy parts disposed to be spaced apart from each other;
    wherein
    the flight apparatus is fixed to the connection frame such that the flight apparatus has a rotational degree of freedom; and
    the buoyancy apparatus is fixed to the connection frame such that the buoyancy apparatus is capable of moving with six degrees of freedom by controlling a thrust of each of the multiple rotors differently.

2. The UAV of claim 1, wherein the connection frame includes a first fixed connection member to which the flight apparatus is fixed, second fixed connection members each connected to a corresponding one of the buoyancy parts, and a rotational coupling part connected between the first fixed connection member and a second fixed connection member of the second fixed connection members.

3. The UAV of claim 1, wherein the connection frame further includes an auxiliary connection member which has a part extending substantially in parallel to a rotational axis of the main body of the flight apparatus and to hold a weight object affixed thereto; and
    wherein the auxiliary connection member includes at least two auxiliary connection members and is connected to a second fixed connection member through a revolving joint.

4. The UAV of claim 2, wherein the second fixed connection member is connected to a surface of the buoyancy apparatus, and an extension line of the second fixed connection member passes through a center of buoyancy existing inside the buoyancy apparatus or crosses a vertical axis passing through the center of buoyancy of the buoyancy apparatus when the buoyancy apparatus is arranged in a horizontal direction.

5. An unmanned aerial vehicle (UAV) comprising:
    a flight apparatus, equipped with multiple rotors formed at respective end portions of multiple extending frames extending outward from a main body, the flight apparatus being capable of moving with six-degrees-of-freedom by controlling a thrust of each of the multiple rotors differently;
    a buoyancy apparatus including buoyancy parts disposed to be spaced apart from each other and configured to secure buoyancy through injection of gas; and
    a connection frame which is connected between the buoyancy parts disposed to be spaced apart from each other and to which the flight apparatus is fixed such that the flight apparatus has a rotational degree of freedom;
    wherein the connection frame includes a first fixed connection member to which the flight apparatus is fixed, second fixed connection members each connected to a corresponding one of the buoyancy parts, and a rotational coupling part connected between the first fixed connection member and a second fixed connection member of the second fixed connection members; and
    wherein the second fixed connection member is connected to a surface of the buoyancy apparatus, the second fixed connection member and the first fixed connection member are disposed in one direction along one extension line, and the extension line crosses a vertical axis passing through a center of buoyancy of the buoyancy apparatus when the buoyancy apparatus is arranged in a horizontal direction.

6. The UAV of claim 5, wherein the connection frame further includes an auxiliary connection member configured to connect to a rotational axis of the main body of the flight apparatus and to hold a weight object thereon.

7. The UAV of claim 6, wherein the auxiliary connection member includes at least two auxiliary connection members and is connected to a second fixed connection member through a revolving joint.

8. The UAV of claim 5, wherein the extension line of the second fixed connection member passes through a center of buoyancy existing inside the buoyancy apparatus.

9. An unmanned aerial vehicle (UAV) comprising:
a flight apparatus equipped with multiple rotors;
a buoyancy apparatus including buoyancy parts disposed to be spaced apart from each other and configured to secure buoyancy through injection of gas; and
a connection frame which is connected between the buoyancy parts disposed to be spaced apart from each other and to which the flight apparatus is fixed such that the flight apparatus has a rotational degree of freedom, the connection frame further comprising an auxiliary connection member configured to hold a weight object thereon,
wherein the connection frame includes a first fixed connection member to which the flight apparatus is fixed, second fixed connection members each connected to a corresponding one of the buoyancy parts, and a rotational coupling part connected between the first fixed connection member and a second fixed connection member of the second fixed connection members,
wherein the auxiliary connection member comprises at least two auxiliary connection members to form a lattice shape and is connected to the second fixed connection member through a revolving joint, and
wherein the second fixed connection member is connected to a surface of the buoyancy apparatus, the second fixed connection member and the first fixed connection member are disposed along a same, straight extension line, and the extension line passes through the buoyancy parts.

10. The UAV of claim 9, wherein the first fixed connection member includes a pair of first fixed connection members spaced apart from each other and coupled to the flight apparatus while having the flight apparatus interposed therebetween.

* * * * *